United States Patent
Goodman et al.

(10) Patent No.: US 6,356,801 B1
(45) Date of Patent: Mar. 12, 2002

(54) HIGH AVAILABILITY WORK QUEUING IN AN AUTOMATED DATA STORAGE LIBRARY

(75) Inventors: Brian Gerard Goodman; Leonard George Jesionowski, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/573,530

(22) Filed: May 19, 2000

(51) Int. Cl.$^7$ ................................................. G06F 7/00
(52) U.S. Cl. ..................... 700/214; 700/216; 700/217
(58) Field of Search ............................... 700/214, 216, 700/217

(56) References Cited

U.S. PATENT DOCUMENTS

| | | | |
|---|---|---|---|
| 4,672,553 A | * 6/1987 | Goldberg ................. | 700/214 X |
| 5,418,971 A | 5/1995 | Carlson ...................... | 395/800 |
| 5,423,018 A | 6/1995 | Dang et al. ................. | 395/425 |
| 5,469,560 A | 11/1995 | Beglin ........................ | 395/439 |
| 5,513,156 A | 4/1996 | Hanaoka et al. ............. | 369/34 |
| 5,566,348 A | 10/1996 | Dahman et al. ............. | 395/838 |
| 5,613,154 A | 3/1997 | Burke et al. ................ | 395/821 |
| 5,740,061 A | 4/1998 | Dewey et al. ............. | 364/478.02 |
| 5,953,234 A | * 9/1999 | Singer et al. ............... | 700/214 X |
| 5,999,356 A | * 12/1999 | Dimitri et al. ............. | 414/932 X |
| 6,052,341 A | * 4/2000 | Bingham et al. ........... | 700/214 X |
| 6,085,123 A | * 7/2000 | Baca et al. ................. | 700/214 X |

\* cited by examiner

Primary Examiner—Christopher P. Ellis
Assistant Examiner—Gene O. Crawford
(74) Attorney, Agent, or Firm—John H. Holcombe; Robert M. Sullivan

(57) ABSTRACT

A work queuing system and method to increase the availability of an automated data storage library for accessing and storing data storage media. At least one accessor moves the data storage media among storage shelves and data storage drives in response to work requests. The work queuing system comprises a communication processor node for receiving the work requests and for broadcasting the work requests, e.g., over a common bus network, to a plurality of work processor nodes coupled to the communication processor node and coupled to each other. Each work processor node responds to the broadcast work requests, establishing a work queue of jobs. At least one of the work processor nodes selects ones of the jobs in the work queue for an accessor and directs the accessor to conduct the selected job. The work processor nodes then synchronize the work queues.

35 Claims, 6 Drawing Sheets

FIG. 5

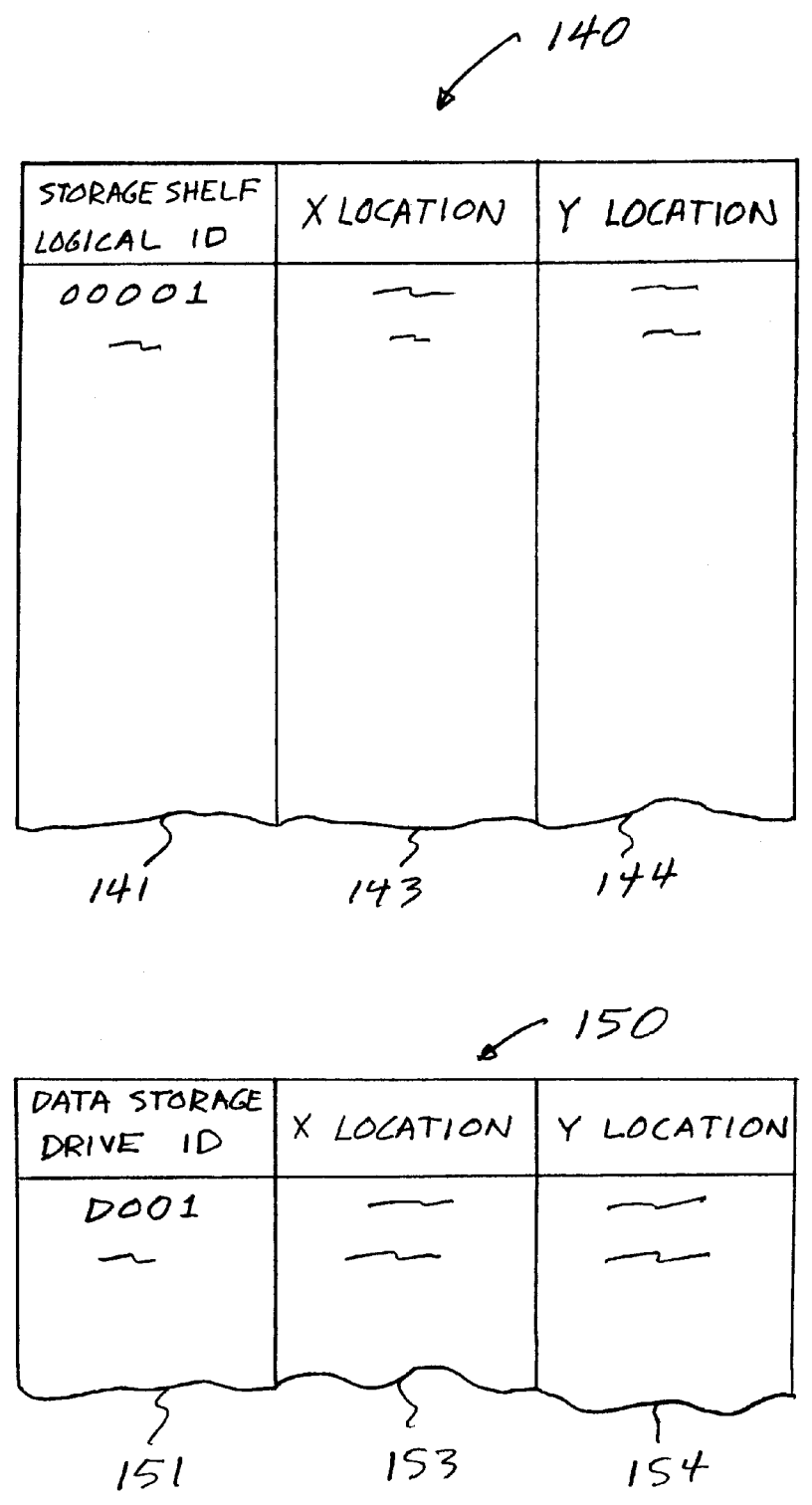

| STORAGE SHELF LOGICAL ID | X LOCATION | Y LOCATION |
|---|---|---|
| 00001 | — | — |
| — | — | — |

| DATA STORAGE DRIVE ID | X LOCATION | Y LOCATION |
|---|---|---|
| D001 | — | — |
| — | — | — |

150
151  153  154

HIGH AVAILABILITY WORK QUEUING IN AN AUTOMATED DATA STORAGE LIBRARY

DOCUMENTS INCORPORATED BY REFERENCE

Commonly assigned, copending U.S. patent application Ser. No. (TUC9-2000-0024-US1) is incorporated for its showing of a distributed control system for an automated data storage library.

FIELD OF THE INVENTION

This invention relates to automated data storage libraries, and, more particularly, to the queuing of received work requests for a library.

BACKGROUND OF THE INVENTION

The typical automated data storage library comprises an accessor having a gripper for accessing data storage media, and which is moved in the X direction and in the Y direction for accessing the data storage media and moving the media between storage shelves and data storage drives.

Also typically, the host system, such as a host server, communicates with a central controller for the library, either directly or through one or more data storage drives, providing commands to access particular data storage media and move the media between the storage shelves and the data storage drives, as well as I/O shelves and pass thru slots. The commands may be logical commands identifying the media and/or logical or physical locations for accessing the media. The central controller includes a processor for receiving the commands and establishing a work queue for the library. As the work queue is processed, the processor converts the commands to physical movements of the accessor, and transmits signals for operating servo motors.

It is desirable to allow for expansion in the library to include additional storage shelves and data storage drives and a second accessor. As an example, an IBM 3494 automated data storage library is scaleable up to 2 end frames, each with an accessor, and 14 extension frames of storage shelves between the end frames. Typically, both accessors travel on similar paths alongside the storage shelves and the data storage drives. Hence, to avoid interference, the central processor designates one accessor as active and the other as inactive, and operates only the active accessor. Thus, the inactive accessor serves as a backup in case the active accessor fails or is taken out of service. Alternatively, the central processor breaks the library into zones of storage shelves and data storage drives and separately operates the accessors to access data storage media in the respective zones.

The central processor and its communication line to the accessor, however, each comprises a single point of failure, failure of which would make the library unavailable for use.

SUMMARY OF THE INVENTION

Disclosed are a work queuing system and method for an automated data storage library which increases the availability of the library without requiring changes to existing host software. The library has a plurality of storage shelves for storing data storage media, at least one data storage drive, and at least one accessor for accessing and delivering data storage media among the storage shelves and the data storage drives in response to work requests. The work queuing system comprises a communication processor node for receiving the work requests and for broadcasting the work requests, e.g., over a common bus network, to a plurality of work processor nodes coupled to the communication processor node and coupled to each other. Each work processor node responds to the broadcast work requests, establishing a work queue of jobs. At least one of the work processor nodes selects ones of the jobs in the work queue for the accessor(s). The work processor node directs an accessor to conduct a selected job, and the work processor node broadcasts information regarding the selected job to other of the work processor nodes, such as completion of the job, so that the work queues may be maintained in synchronism.

To maintain the work queues in synchronism, each of the other work processor nodes additionally, upon receiving the broadcast job information, removes the selected job from its work queue.

For a fuller understanding of the present invention, reference should be made to the following detailed description taken in conjunction with the accompanying drawings.

BRIEF DESCRIPTION OF THE DRAWINGS

FIG. 5 is a diagrammatic representation of a map of data storage shelves of the automated data storage library of FIGS. 1 and 3;

FIG. 6 is a diagrammatic representation of a map of data storage drives of the automated data storage library of FIGS. 1 and 3;

FIG. 7 is a flow chart depicting an embodiment of the method of broadcasting work requests in accordance with the present invention;

FIG. 8 is a flow chart depicting an embodiment of the method of determining accessor availability in accordance with the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
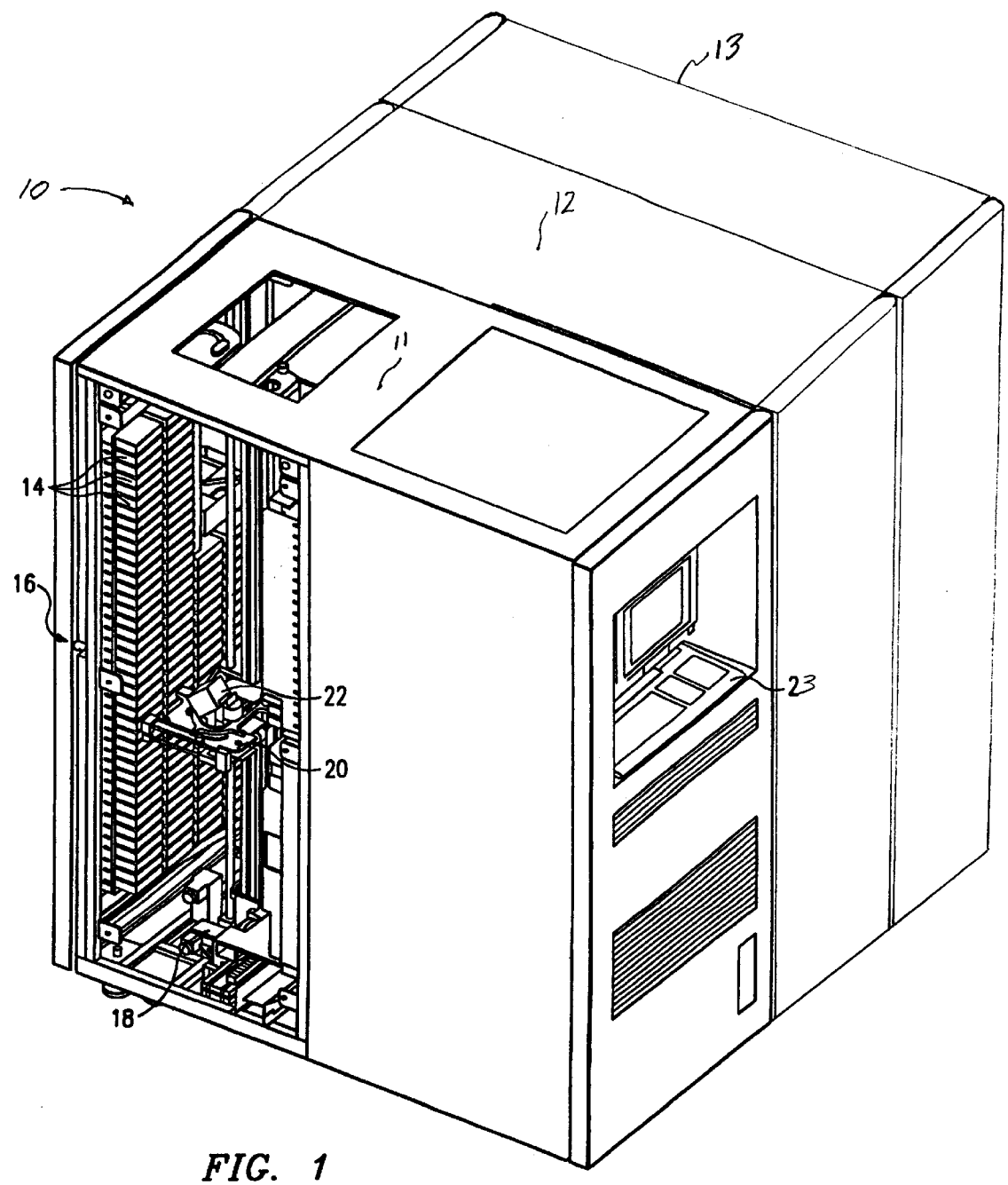
FIG. 1 is an isometric view of an automated data storage library implementing an embodiment of the present invention.
Figure 3:
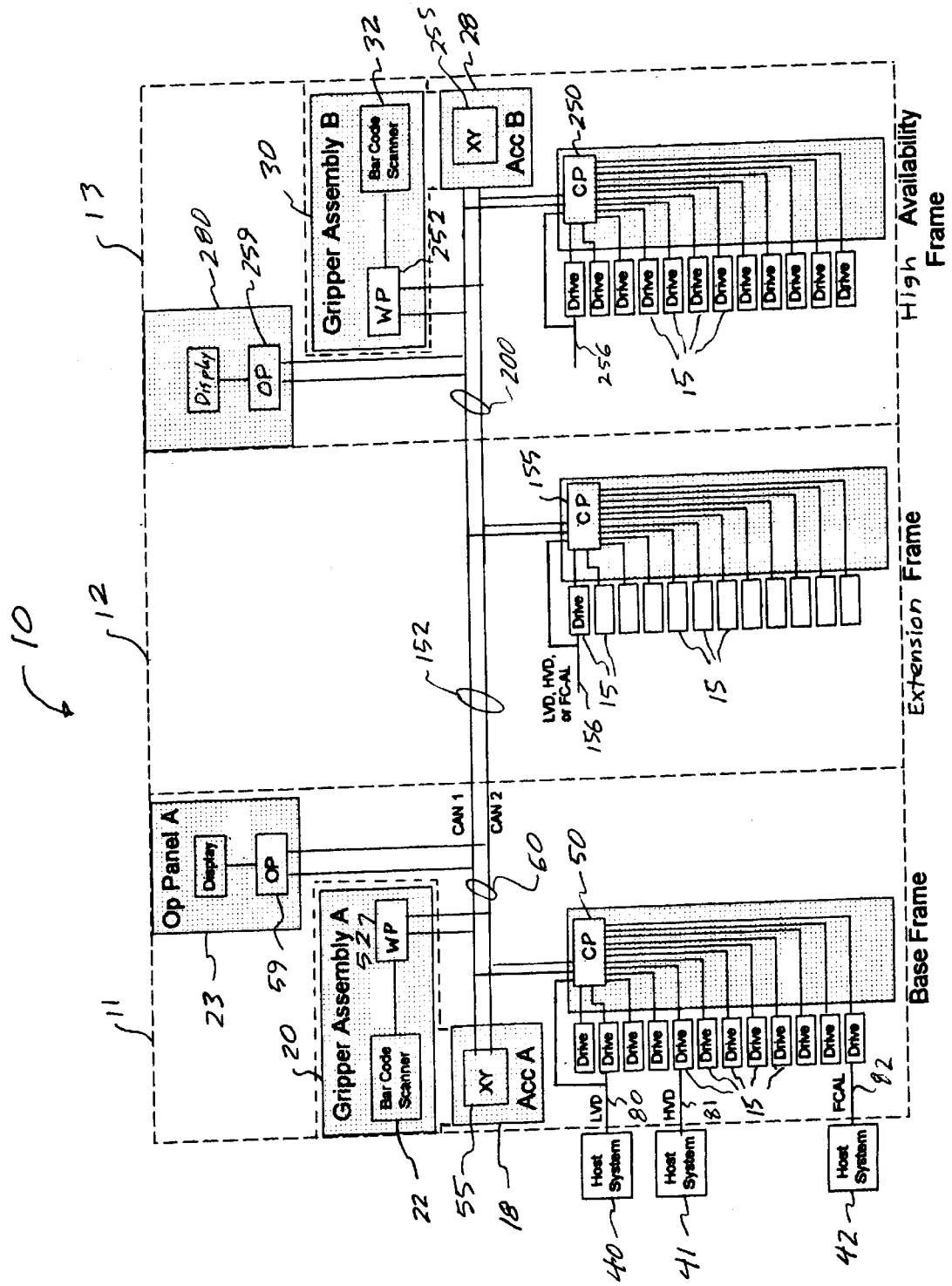
FIG. 3 is a block diagram of an embodiment of the distributed control system of the automated data storage library of FIG. 1 in accordance with the present invention employing processor nodes of FIG. 2.

FIGS. 1 and 3 illustrate an automated data storage library 10 which stores and retrieves data storage media 14 in storage shelves 16. An example of an automated data storage library which may implement the present invention is the IBM 3494 Tape Library Dataserver. The library comprises a base frame 11, may additionally comprise one or more extension frames 12, and may comprise a high availability frame 13.

The base frame 11 of the library 10 comprises one or more data storage drives 15, and an accessor 18. The accessor 18 includes a gripper assembly 20 and may include a bar code scanner 22 or reading system, such as a smart card reader or similar system, mounted on the gripper 20, to "read" identifying information about the data storage media 14. The data storage drives 15, for example, may be optical disk drives or magnetic tape drives, and the data storage media 14 may comprise optical or magnetic tape media, respectively, or any other removable media and associated drives. The library may also comprise an operator's panel 23 or other user interface, such as a web-based interface, which allows a user to interact with the library.

The extension frame 12 comprises additional storage shelves, and may comprise additional data storage drives 15. The high availability frame 13 may also comprise additional storage shelves and data storage drives 15, and comprises a second accessor 28, which includes a gripper assembly 30 and may include a bar code scanner 32 or other reading device, and an operator's panel 280 or other user interface. In the event of a failure or other unavailability of the accessor 18, or its gripper 20, etc., the second accessor 28 may take over.

As discussed in the incorporated, copending ('0024) application, the accessors 18, 28 each move the gripper in at least two directions, called the horizontal "X" direction and vertical "Y" direction, to retrieve and grip, or to deliver and release the data storage media 14 at the storage shelves 16 and to load and unload the data storage media at the data storage drives 15.

Referring to FIG. 3, the library 10 receives commands from one or more host systems 40, 41 or 42. The host systems, such as host servers, communicate with the library, either directly, e.g., on path 80, or through one or more data storage drives 15, providing commands to access particular data storage media and move the media, for example, between the storage shelves and the data storage drives. The commands are typically logical commands identifying the media and/or logical locations for accessing the media.

As discussed in the incorporated, copending ('0024) application, and as may be employed in accordance with the present invention, the library is controlled, not by a central controller, but rather, by a distributed control system for receiving the logical commands and converting the commands to physical movements of the accessor 18, 28.

The distributed control system comprises a communication processor node 50, which may be located, for example, in the base frame 11. The communication processor node provides a communication link for receiving the host commands, either directly or from the drives 15. The communication processor node 50 may additionally provide a communication link for operating the data storage drives 15. The communication processor node 50 may be located in the frame 11, close to the data storage drives 15. In accordance with the present invention, redundant work processor nodes are provided, which may comprise a work processor node 52 that may be located at the accessor 18, and that is coupled to the communication processor node 50. As will be discussed, each work processor node responds to received commands that are broadcast to the work processor nodes from any communication processor node, and provides a work queue. The work processor node may also direct the operation of the accessor, providing move commands. An XY processor node 55 may be provided and may be located at an XY system of the accessor 18. The XY processor node 55 is coupled to the work processor node 52, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

As discussed in the incorporated, copending ('0024) application, and as may be employed in accordance with the present invention, a common bus 60 may be provided, coupling the communication processor node 50 to the work processor node 52, and coupling the work processor node to the XY processor node 55. The operator panel processor node 59 may also be coupled to the common bus 60. The common bus may comprise a redundant wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks may be employed for implementing the present invention. Alternatively, the common bus 60 may comprise a wireless network system, such as RF or infrared, as is known to those of skill in the art.

The present invention employs the common bus and the distributed control system of the incorporated, copending ('0024) application, to provide a work queuing system and method for an automated data storage library which increases the availability of the library without requiring changes to existing host software.

Each of the processor nodes may either recognize a message identifier associated with each message on the common bus, in accordance with CAN protocol, or may be specifically addressed with each message, for example, as is known in SCSI bus systems.

Each of the processor nodes may comprise special logic circuits or microprocessor systems, each designed for the special purpose, as is known to those of skill in the art, or may comprise similar microprocessor systems, each having specialized firmware to operate the processor node.

Figure 2:
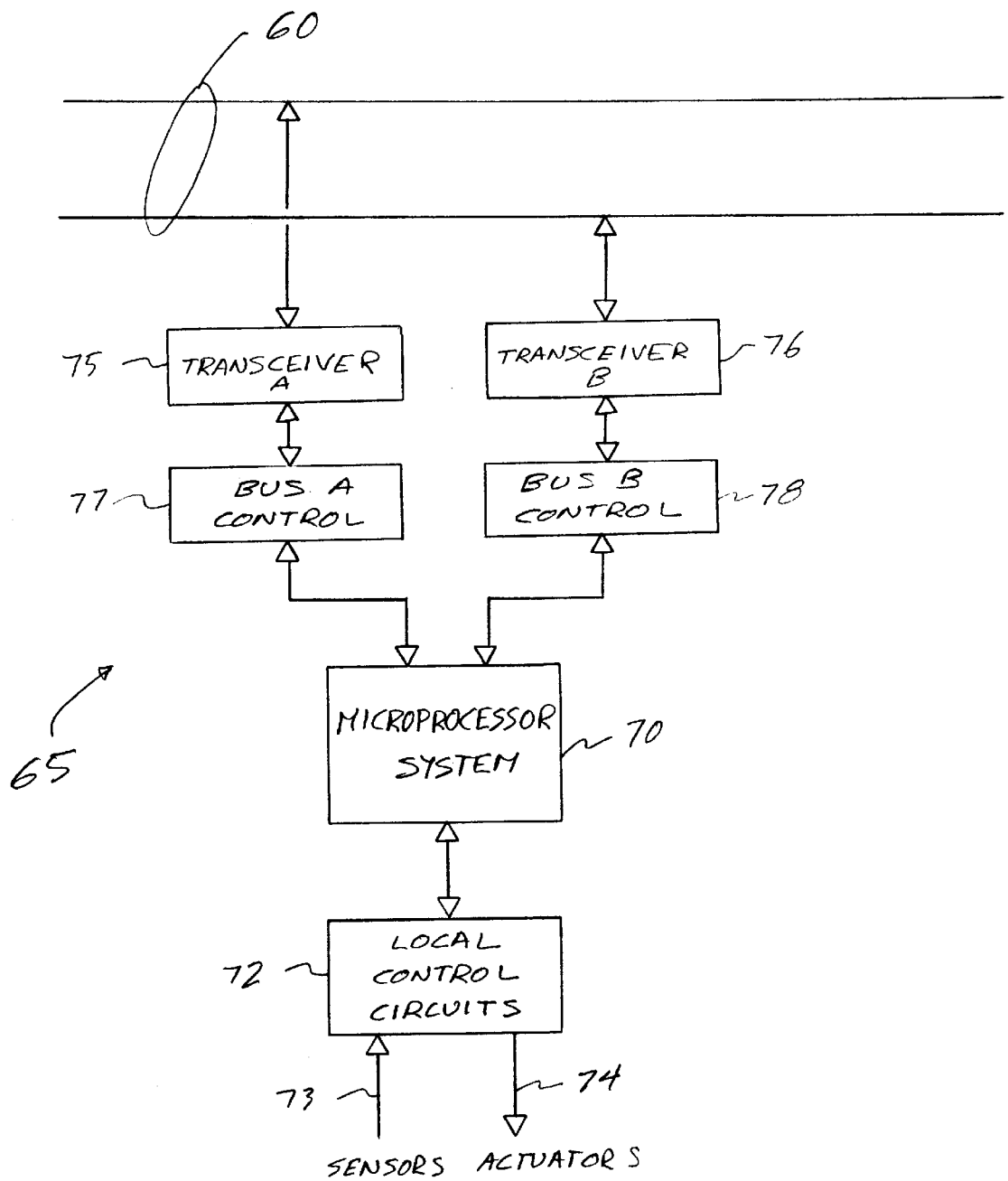
FIG. 2 is a block diagram of an embodiment of a processor node employed to control and operate components of the automated data storage library of FIG. 1.

FIG. 2 illustrates an embodiment of a processor node 65 employed to control and operate components of the automated data storage library 10. A microprocessor system 70 typically comprises a microprocessor of the type that is commercially available, for example, from Intel or AMD, and a non-volatile memory for storing the firmware which operates the microprocessor. The microprocessor is coupled to local control circuits 72 which respectively receive digital signals 73 from sensors, and send digital signals 74 to operate attached actuators, such as servo motors, and communicate with the microprocessor system 70. Examples of such local control circuits are known to those of skill in the art.

In accordance with the protocols of the common bus system, discussed above, as is known to those of skill in the art, one or more transceivers 75, 76, and one or more bus control logic circuits 77, 78, are employed to communicate between the microprocessor system 70 and the common bus 60. The transceivers and bus control logic respond to identifiers or addresses associated with messages on the common bus 60, providing the messages to the microprocessor system 70, and compose messages originating with the microprocessor system, adding identifiers or addresses to the messages, and providing the messages to the common bus 60.

The firmware of the microprocessor system 70 responds to the messages provided by the transceivers 75, 76 and bus control logic circuits 77, 78, and to signals provided by the local control circuits 72, and provides signals to the local control circuits 72 and messages to the transceivers 75, 76 and bus control logic circuits 77, 78, so as to communicate over the common bus and to operate selected functions.

Referring to FIG. 3, one of the processor nodes may be implemented as the communication processor node 50 and is coupled to each of the data storage drives 15 of the base frame 11, communicating with the drives and with host systems 40, 41 and 42. Alternatively, the host systems may be directly coupled to the communication processor node 50. As is known to those of skill in the art, various communication arrangements may be employed for communication with the hosts and with the data storage drives. In the example of FIG. 3, host connections 80 and 81 are SCSI busses. Bus 82 comprises an example of a fibre channel arbitrated loop which is a high speed serial data interface, allowing transmission over greater distances than the SCSI bus systems. The data storage drives 15 may be in close proximity to the communication processor node 50, and may employ a short distance communication scheme, such as SCSI, or a serial connection, such as RS-422.

Referring to FIG. 3, as discussed in the incorporated, copending ('0024) application, and as may be employed in accordance with the present invention, an extension frame 12 may e provided, and may be coupled by an extension common bus 152 to the base frame common bus 60. Another communication processor node 155 may be located in the extension frame and may communicate with both hosts and data storage drives 15 in frame 12, e.g., at input 156. Thus, commands from hosts may be received either directly or via the data storage drives. The communication processor node 155 is coupled to the extension common bus 152, the communication processor node providing a communication link for the commands to the extension common bus 152, so that the commands are linked to the base frame common bus 60 and to the work processor node 52, as will be discussed. The extension common bus 152 may comprise a flex cable connection and a multi-drop bus network coupled to the base frame common bus 60 in the base frame.

The communication processor node 155 may be mounted in the extension frame 12, closely adjacent to the coupled data storage drives 15 of the extension frame 12, communicating with the drives and with the attached host systems.

Additional extension frames with identical communication processor nodes 155, storage shelves 16, data storage drives 15, and extension busses 152, may be provided and each is coupled to the adjacent extension frame.

Further, referring to FIG. 3, as discussed in the incorporated, copending ('0024) application, and as may be employed in accordance with the present invention, the automated data storage library 10 additionally comprises another accessor 28, for example, in a high availability frame 13. The accessor 28 may comprise a gripper 30 for accessing the data storage media, and an XY 255 system for moving the accessor. The high availability frame may be adjacent an extension frame 12, or adjacent the base frame 11, and the accessor 28 may run on the same mechanical path as accessor 18, or on an adjacent path. The distributed control system additionally comprises an extension common bus 200 coupled to the extension common bus 152 of an extension frame or to the common bus 60 of the base frame. Another communication processor node 250 may be provided, and may be located in the high availability frame 13, for receiving commands from hosts, either directly or from data storage drives 15, e.g., at input 256. The communication processor node 250 is coupled to the high availability frame extension common bus 200 and provide a communication link for the commands to the extension common bus, as will be discussed. In accordance with the present invention, a work processor node 252 is located at the accessor 28, coupled to the high availability frame extension common bus 200. The work processor nodes 52 and 252 thus comprise an embodiment of redundant work processor nodes.

Alternatively in accordance with the present invention, the communication processor node 50, 155, and/or 250 may be programmed to comprise either an additional work processor node, or as one of the work processor nodes 52, 252. As a further alternative, an additional work processor node may be mounted, either on the frame 11, 12, 13, or on the accessor 18, 28. Each of the processor nodes is coupled to the common bus 60, 152, or 200.

Referring to FIG. 3, in accordance with an embodiment of the present invention, the work queuing system comprises one of the communication processor nodes 50, 155, 250, providing a communication link for the commands received from the hosts 40–42, e.g., at inputs 156, 256, interpreting and converting the commands as needed, and broadcasting the work requests, e.g., over the common bus network 60, 152, 200, to the plurality of work processor nodes 52, 252 coupled to the communication processor node. In the example of a CAN bus system, as discussed above, with all of the processor nodes coupled to a common bus, each work processor node recognizes that a broadcast message is intended for that node. Each work processor node 52, 252 responds to the broadcast work requests, establishing a work queue of jobs. The redundant work processor nodes and redundant work queues increase the availability of the library in that failure of one work processor node or work queue results in automatic fail over to the other. At least one of the work processor nodes selects the next one of the jobs in the work queue for one of the accessors 18, 28. The work processor node 52, 252 broadcasts information relating to the job selection to the other work processor node 52, 252, on common bus 60, 152, 200, so that the work queues may be maintained in synchronism. The selecting work processor node directs the associated accessor to conduct the selected job, and may employ the common bus. In a preferred embodiment, the work processor node 52, 252 that selected a job, broadcasts an identification of the selected job upon completion of the job. In an alternative embodiment, the work processor that selected a job broadcasts the identification of the selected job upon selection of the job. It may also broadcast completion of the selected jobs. In another alternative embodiment, the selecting work processor node provides the information to direct the associated accessor on the common bus to the accessor. The work processor nodes monitor the common bus 60, 152, 200 to detect the XY network traffic. The non-selecting work processor node(s) monitoring the XY network traffic on the common bus 60, 152, 200, determine what work is being initiated and completed, and determine the job selection or completion. Hereinafter, these and other alternatives will be characterized generically as the broadcast of information relating to the job selection.

Figure 4:
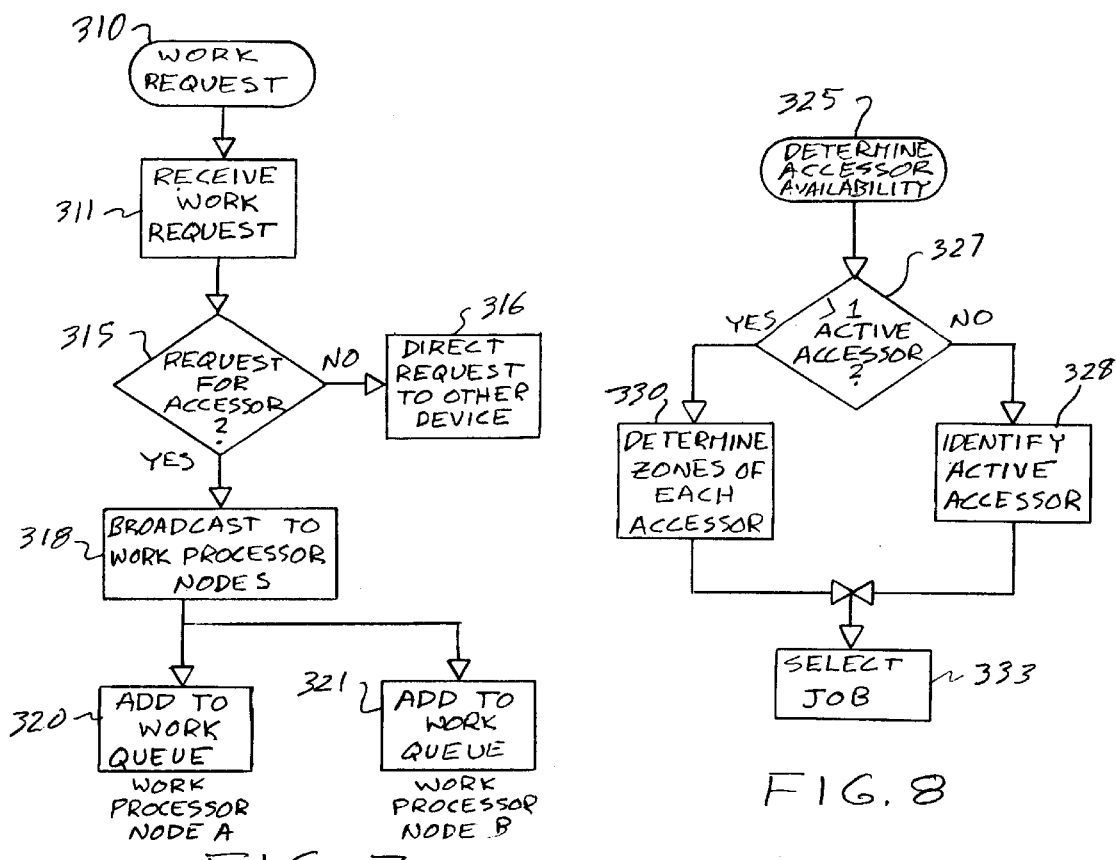
FIG. 4 is a diagrammatic representation of a work queue employed in accordance with the present invention.

An example of a work queue 300 is illustrated on FIG. 4. As discussed above, the work request from the host may comprise a logical command identifying the media and/or logical locations for accessing and for delivering the media, for example, between storage shelves and data storage drives. The communication processor node receives the command and may simply forward each command in the broadcast, or may selectively combine individual move commands, or separate complex commands. The resultant command is broadcast by the communication processor node 50, 155, 250 to the redundant work processor nodes 52, 252, and each work processor node places the received command in its work queue 300. The work processor may place the command in the work queue, employing the logical locations of, e.g., the source and destination, or may convert the logical locations to the physical locations. The exemplary work queue therefore comprises a job identifier 302, indicates the job type 303, and the source 304 and destination 305 of the move. The queue location may be identified by an identifier 306, or may be simply identified by a pointer or location in the queue.

If both accessors 18 and 28 are active at the same time, the work processor nodes may allocate the accessors to separate zones of the library, each zone comprising selected ones of the storage shelves and data storage drives. The arrangement of zones may be conducted in a manner as is known to those of skill in the art. Additionally, in normal operation at least one work processor node may be associated with each accessor. Hence, each work processor node may convert any logical locations into the physical locations in order to assess the zones and whether the associated accessor is allocated to the zone of the next job in the work queue 300. In the event of failure of one of the work processor nodes, a remaining work processor node may control the multiple accessors.

The work processor nodes 52, 252 are programmed to be responsive to the broadcast commands, selecting a command for an accessor, and directing the accessor to conduct the job. In so doing, the work processor node may provide X and Y move commands. The work processor node may employ tables such as illustrated in FIGS. 5 and 6 to generate the move commands, as is known to those of skill in the art. For example, FIG. 5 comprises a table 140 which relates the logical identifier 141 of a storage shelf of a received command to the physical X location 143 and the physical Y location 144 of the storage shelf 16 (in FIG. 1) in the library 10. Table 150 in FIG. 6 relates the logical identifier 151 of a data storage drive of a received command to the physical X location 153 and the physical Y location 154 of the data-storage drive 15 in the library 10. The work processor node 52, 252 employs the tables to determine the physical location to retrieve the data storage media and the physical location to deliver the data storage media, and may employ the information in the work queue 300. Upon selecting a job, the work processor node may calculate the X and Y distances to be moved in the X and Y directions from the source to the destination. The work processor node may then provide the move commands to the XY processor node, directing the accessor 18, 28 to conduct the selected job.

Figure 9:
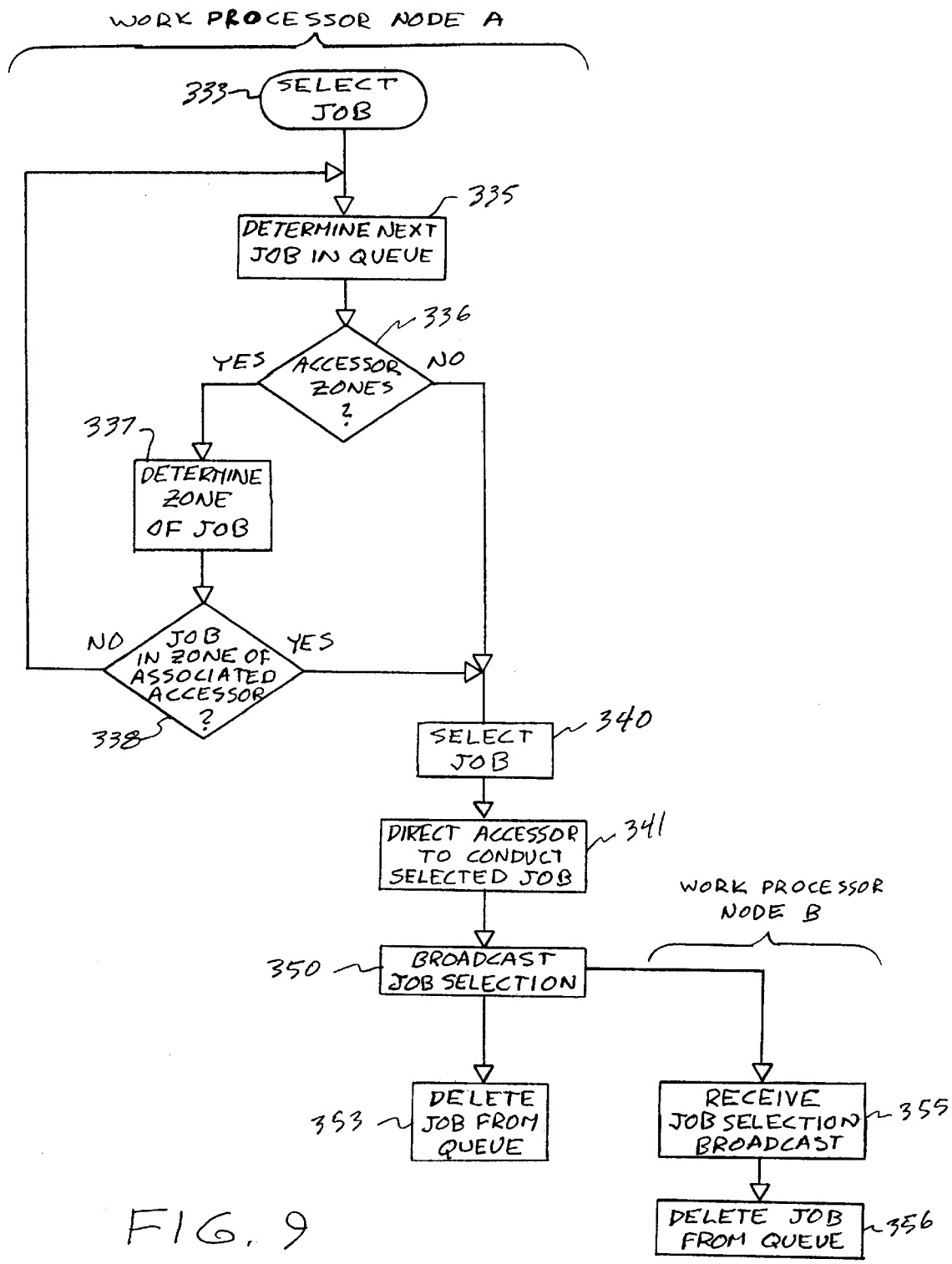
FIG. 9 is a flow chart depicting an embodiment of the method of selecting jobs from the work queue of FIG. 4 and broadcasting the job selection in accordance with the present invention.

Exemplary embodiments of the method of the present invention are illustrated in FIGS. 7–9. Referring to FIGS. 3, 4 and 7, a work request is provided by a host 40–42 in step 310. In step 311, one of the communication processor nodes 50, 155, 250 receives the work request, interpreting and converting the commands as needed. In step 315, the receiving communication processor node determines whether the received work request is for an accessor or for another element of the library. If the work request does not involve an accessor, the request is directed to the other device in step 316. If the request involves an accessor, the receiving communication processor node 50, 155, 250, in step 318, broadcasts the work request, e.g., over the common bus network 60, 152, 200, to the plurality of work processor nodes 52, 252 coupled to the communication processor node. In steps 320 and 321, each of the work processor nodes 52, 252 responds to the broadcast of the work request, establishing a work queue 300, adding the job to the work queue. In this manner, by providing the redundant work processor nodes and redundant work queues in accordance with the present invention, the availability of the library is increased without requiring changes to the host software.

Referring to FIGS. 3 and 8, the work processor nodes 52, 252 determine the accessor availability, beginning at step 325. The determination is preferably conducted at an initialization, but alternatively may be conducted periodically or for each job. In step 327, the work processor nodes determine whether more than one accessor 18, 28 is currently active. If only one accessor is available, the work processors determine, in step 328, which of the accessors 18, 28 is currently active. For example, the base frame accessor 18 may be the primary accessor, and work processor node 252 of the high availability frame may programmed to determine if the base frame accessor 18 is unavailable, and, in the event the base frame accessor is unavailable, to activate the accessor 28. Alternatively, both the communication processor node 50 of the base frame and the communication processor node 250 of the high availability frame may be programmed to determine if the base frame accessor 18 is unavailable and activate the accessor 28 if this is the case. In accordance with the present invention, all the work processor nodes may conduct the method in parallel to assure full redundancy, with one of the active work processor nodes having priority, the other(s) serving as back up. As is understood by those of skill in the art, a garage may be provided for storage of accessor 18, and either high availability frame 13 may have a garage or be without storage shelves or data storage drives to provide storage of accessor 28.

If more than one accessor is active, at least one work processor is associated with each accessor. Hence, as the result of the determination in step 327, each work processor, in step 330, determines the allocation of the accessors 18, 28 to the zones. For example, each of the zones, and therefore the allocated accessor, is given certain bounds. As an alternative, as is known to those of skill in the art, the zones may be dynamic and determined based on the set of jobs to be conducted in the work queue. A job may then be selected in step 333.

Referring to FIGS. 3, 4 and 9, the work processor nodes 52, 252 select a job from the work queue 300, beginning at step 333. For the purpose of illustration, the method of FIG. 9 is conducted by one of the work processor nodes 52, 252 having priority, shown as work processor node "A", while another work processor node "B" receives the broadcast from the work processor node "A". Alternatively, both work processor nodes may operate in parallel, and only the node having priority will provide an output. In step 335, the work processor node determines the next job in the work queue 300. In step 336, the work processor node determines whether accessors are active in separate zones, or whether only one accessor is active for the library. If the accessors are active in separate zones, the work processor node may convert any logical locations of the job into the physical locations in order to assess the zones in step 337, as discussed above, and, in step 338, may determine whether the associated accessor is allocated to the zone of the job in the work queue 300. If the associated accessor is not allocated to the zone of the job, the associated work processor node 52, 252 cycles back to step 335 to determine the next job in the work queue. In order to maintain the work queues in synchronism, the work processor node "A" may wait for the other work processor node "B" to select the job and operate its associated accessor. As is known to those of skill in the art, the zones may be dynamic for work that would otherwise span zones, so as to accomplish the work and provide collision avoidance.

In the event that either work processor node 52, 252 is unavailable, in accordance with the present invention, the work processor node that is available is associated with both accessors, and, in step 338, assigns the job to the accessor that is allocated to the zone. As the result, the redundant work processor nodes and redundant work queues increase the availability of the library without requiring changes to the host software.

If only one accessor is active, "NO" in step 336, or if the job is in the zone of the accessor associated with the work processor node "A", "YES" in step 338, then that job is selected by the work processor node in step 340, and the work processor node directs the associated accessor to conduct the selected job in step 341. As discussed above, the work processor node may provide the move commands to an XY processor node 55, 255 of an XY system of the associated accessor 18, 28.

In accordance with the present invention, after selecting a job, the work processor node "A", 52, 252 broadcasts information relating to the job selection to the other work processor nodes "B" 52, 252, in step 350, so that the work queues may be maintained in synchronism. In one embodiment, the work processor node that selected the job in step 340, e.g., work processor node "A", deletes the job from its work queue 300 in step 353. As discussed above, the work processor nodes are coupled by means of the common bus. Thus, the other work processor node(s) "B", receives the information related to the job selection broadcast from work processor node "A" in step 355, and deletes the job from its (their) work queue 300 in step 356. As a preferred alternative, the work processor node "A" may delete the job from its queue and broadcast an identification of the selected job only after the job has been completed. As another alternative, the work processor node "A" may delete the job from its queue and broadcast the job selection, such as an identification of the selected job, as soon as the job is selected in step 340. The identification of the selected job may comprise the job identifier 302 of FIG. 4. Another alternative comprises the broadcast of the directing information, such as information from tables 140 and 150, in step 141 by the selecting work processor node on the common bus network, and a monitoring of the common bus network by the work processor nodes. The non-selecting work processor nodes may determine job selection or completion from the monitored information. Thus, steps 350 and 355 may occur, in sequence, at differing places in the order of steps of FIG. 9.

Thus, each of the work queues 300 of each of the work processor nodes 52, 252 are therefore in synchronism. As the result, should one of the work processor nodes fail or lose communication, the system may automatically switch to the other work processor node, and employ its work queue singly to continue operation of the system, thereby increasing the availability of the system.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for operating an automated data storage library, said library having a plurality of storage shelves for storing data storage media, at least one data storage drive, and at least one accessor for accessing and delivering data storage media among said storage shelves and said at least one data storage drive in response to work requests, comprising the steps of:

receiving said work requests;

broadcasting said work requests to a plurality of work processor nodes;

said work processor nodes each establishing a work queue of jobs in response to said broadcast work requests;

at least one of said work processor nodes selecting at least one of said jobs in said work queue for said at least one accessor;

directing said-accessor to conduct each said selected job; and synchronizing said work queues.

2. The method of claim 1, wherein said library comprises a plurality of said accessors, and additionally comprising the step of said work processor nodes designating one of said plurality of accessors as active, and wherein said selecting and directing step comprises conducting said step for said active accessor.

3. The method of claim 1, wherein said library comprises a plurality of said accessors, and additionally comprising the step of said work processor nodes allocating said accessors to separate zones of said library, each said zone comprising selected ones of said storage shelves and data storage drives, and wherein said selecting and directing steps comprise said work processor nodes conducting said steps for selected ones of said jobs in said work queue that are in said zone for said accessor.

4. The method of claim 1, wherein said work request receiving and broadcasting steps comprise at least one communication processor node receiving said work requests, and broadcasting said work requests to said plurality of work processor nodes.

5. The method of claim 4, wherein said input work requests are received at least one of said data storage drives and said work request receiving step comprises said communication processor node receiving said requests from said at least one data storage drive.

6. The method of claim 4, wherein said work request broadcasting and said job selection information broadcasting steps are conducted on a common bus coupling said communication processor node and all of said plurality of work processor nodes.

7. The method of claim 1, wherein said synchronizing step comprises broadcasting information relating to said job selection to other of said work processor nodes.

8. The method of claim 7, wherein said synchronizing step additionally comprises the step of:

each of said work processor nodes deleting said broadcast selected job from said work queue of said work processor node.

9. The method of claim 8, wherein said information broadcasting step comprises, said work processor node which selects said job in said selecting step, responding to said directed accessor for completion of said selected job, broadcasting an identification of said selected job upon completion of said selected job.

10. The method of claim 8, wherein said information broadcasting step comprises, said work processor node which selects said job in said selecting step, broadcasting an identification of said selected job upon selecting said job in said selecting step.

11. The method of claim 8, wherein said information broadcasting step comprises, said work processor node directing said job in said directing step, broadcasting information relating to said directing step, said work processor nodes monitoring said broadcast information to determine said job selection.

12. A work queuing system for an automated data storage library, said library having a plurality of storage shelves for storing data storage media, at least one data storage drive, and at least one accessor for accessing and delivering data storage media among said storage shelves and said at least one data storage drive in response to work requests, said work queuing system comprising:
 a communication processor node for receiving said work requests and for broadcasting said work requests; and
 a plurality of work processor nodes coupled to said communication processor node and coupled to each other, each responding to said broadcast work requests, said work processor nodes each establishing a work queue of jobs in response to said broadcast work requests, at least one of said work processor nodes selecting at least one of said jobs in said work queue for said at least one accessor, directing said accessor to conduct each said selected job, and, said work processor nodes synchronizing said work queues.

13. The work queuing system of claim 12, wherein said library comprises a plurality of said accessors, wherein said work processor nodes additionally designate one of said plurality of accessors as active, selecting said jobs only for said active accessor.

14. The work queuing system of claim 12, wherein said library comprises a plurality of said accessors, and wherein said work processor nodes additionally allocate said accessors to separate zones of said library, each said zone comprising selected ones of said storage shelves and data storage drives, and wherein said work processor nodes additionally select said jobs in said work queue for said accessors that are in said zone to which said accessor is allocated.

15. The work queuing system of claim 12, additionally comprising a common bus coupling said communication processor node and all of said plurality of work processor nodes, for conducting said work request broadcasting and said job selection broadcasting.

16. The work queuing system of claim 12, wherein said communication processor node is coupled to said data storage drives, and wherein said input work requests are received at at least one said data storage drive, said communication processor node receiving said requests from said coupled at least one data storage drive.

17. The work queuing system of claim 12, wherein said communication processor node comprises one of said plurality of work processor nodes, said communication processor node receiving said work requests, and broadcasting said work requests to other of said plurality of work processor nodes.

18. The work queuing system of claim 12, comprising a plurality of said communication processor nodes for receiving said work requests, each said communication processor node coupled to said work processor nodes for broadcasting said work requests.

19. The work queuing system of claim 12, additionally comprising a common bus coupling said plurality of work processor nodes, and wherein said work processor nodes broadcast information on said common bus relating to said job selection for synchronizing said work queues.

20. The work queuing system of claim 19, wherein each of said work processor nodes deletes said selected job from said work queue of said work processor node to synchronize said work queues.

21. The work queuing system of claim 20, wherein said one of said work processor nodes that selects said job responds to said directed accessor completing said directed job, broadcasting an identification of said selected job on said common bus upon completion of said selected job.

22. The work queuing system of claim 20, wherein said one of said work processor nodes that selects said job, upon selecting said job, broadcasts an identification of said selected job on said common bus.

23. The work queuing system of claim 20, wherein said common bus is additionally coupled to said accessors; wherein said one of said work processor nodes that directs said accessor to conduct said selected job, directs said accessor, broadcasting information relating thereto on said common bus; and wherein said work processor nodes additionally monitor said broadcast information on said common bus to determine said job selection.

24. An automated data storage library for storing and accessing data storage media in response to work requests, comprising:
 a plurality of storage shelves for said storing data storage media;
 at least one data storage drive;
 at least one accessor for accessing and delivering said data storage media among said storage shelves and said at least one data storage drive;
 a communication processor node for receiving said work requests and for broadcasting said work requests; and
 a plurality of work processor nodes coupled to said communication processor node and coupled to each other, each responding to said broadcast work requests, said work processor nodes each establishing a work queue of jobs in response to said broadcast work requests, at least one of said work processor nodes selecting at least one of said jobs in said work queue for said at least one accessor, directing said accessor to conduct said selected job, and, said work processor nodes synchronizing said work queues.

25. The automated data storage library of claim 24, comprising a plurality of said accessors, wherein said work processor nodes additionally designate one of said plurality of accessors as active, selecting said jobs only for said active accessor.

26. The automated data storage library of claim 24, comprising a plurality of said accessors, and wherein said work processor nodes additionally allocate said accessors to separate zones of said library, each said zone comprising selected ones of said storage shelves and data storage drives, and wherein said work processor nodes additionally select said jobs in said work queue for said accessors that are in said zone to which said accessor is allocated.

27. The automated data storage library of claim 24, additionally comprising a common bus coupling said communication processor node and all of said plurality of work processor nodes, for conducting said work request broadcasting and said job selection broadcasting.

28. The automated data storage library of claim 24, wherein said communication processor node is coupled to said data storage drives, and wherein said input work requests are received at at least one said data storage drive, said communication processor node receiving said requests from said coupled at least one data storage drive.

29. The automated data storage library of claim 24, wherein said communication processor node comprises one of said plurality of work processor nodes, said communication processor node receiving said work requests, and broadcasting said work requests to other of said plurality of work processor nodes.

30. The automated data storage library of claim 24, comprising a plurality of said communication processor nodes for receiving said work requests, each said communication processor node coupled to said work processor nodes for broadcasting said work requests.

31. The automated data storage library of claim 24, additionally comprising a common bus coupling said plurality of work processor nodes, and wherein said work processor nodes broadcast information on said common bus relating to said job selection for synchronizing said work queues.

32. The automated data storage library of claim 31, wherein each of said work processor nodes deletes said selected job from said work queue of said work processor node to synchronize said work queues.

33. The automated data storage library of claim 32, wherein said one of said work processor nodes that selects said job responds to said directed accessor completing said directed job, broadcasting an identification of said selected job on said common bus upon completion of said selected job.

34. The automated data storage library of claim 32, wherein said one of said work processor nodes that selects said job, upon selecting said job, broadcasts an identification of said selected job on said common bus.

35. The automated data storage library of claim 32, wherein said common bus is additionally coupled to said accessors; wherein said one of said work processor nodes that directs said accessor to conduct said selected job, directs said accessor, broadcasting information relating thereto on said common bus; and wherein said work processor nodes additionally monitor said broadcast information on said common bus to determine said job selection.

* * * * *

UNITED STATES PATENT AND TRADEMARK OFFICE
CERTIFICATE OF CORRECTION

PATENT NO. : 6,356,801 B1
DATED : March 12, 2002
INVENTOR(S) : Goodman et al.

It is certified that error appears in the above-identified patent and that said Letters Patent is hereby corrected as shown below:

<u>Column 1,</u>
Line 7, change "application Ser. No. (TUC9-2000-0024-US1)" to -- USP 6,356,803, issued Mar. 12, 2002 --

<u>Column 10,</u>
Line 20, change "said-accessor" to -- said accessor --

Signed and Sealed this

Ninth Day of July, 2002

Attest:

JAMES E. ROGAN
Attesting Officer   Director of the United States Patent and Trademark Office